United States Patent [19]

Sartor et al.

[11] Patent Number: 4,533,089

[45] Date of Patent: Aug. 6, 1985

[54] APPARATUS FOR MAKING CRISSCROSS-WOUND LAYERS TO FORM WOUND BODIES

[75] Inventors: Bruno Sartor, Niederzier-Krauthausen; Klaus Rode, Jülich, both of Fed. Rep. of Germany

[73] Assignee: Uranit GmbH, Jülich, Fed. Rep. of Germany

[21] Appl. No.: 536,957

[22] Filed: Sep. 29, 1983

[30] Foreign Application Priority Data

Oct. 6, 1982 [DE] Fed. Rep. of Germany ....... 3236946

[51] Int. Cl.³ .................... B65H 54/64; B65H 81/08
[52] U.S. Cl. ................................. 242/7.21; 156/425; 156/446; 242/157 R
[58] Field of Search ...................... 242/2, 3, 7.21, 7.22, 242/7.23, 42, 157 R, 157.1; 156/425, 428, 429, 430, 431, 446

[56] References Cited

U.S. PATENT DOCUMENTS

| | | | |
|---|---|---|---|
| 2,345,544 | 3/1944 | Worthington | 242/157 R |
| 3,146,962 | 9/1964 | Hardwick | 242/2 |
| 3,708,132 | 1/1973 | Lang | 156/446 |
| 4,359,356 | 11/1982 | Kornbichler et al. | 156/425 |

Primary Examiner—Billy S. Taylor
Attorney, Agent, or Firm—Spencer & Frank

[57] ABSTRACT

An apparatus for making a rotationally symmetrical body formed of crisscross-wound layers includes a winding mandrel, a carriage reciprocating along the mandrel and a thread laying assembly mounted on the carriage. The assembly has a pivotal device, and four thread laying rollers mounted for rotation on the pivotal device. The shafts of the rollers extend parallel to one another and are situated at points of an imaginary equilateral trapezoid having a plane perpendicular to the roller shafts. Each roller has a plurality of circumferential grooves for simultaneously guiding and depositing on the mandrel a plurality of parallel-running threads. Two rollers are situated on one side of the pivot axis of the pivotal device and form a first roller pair and two rollers are situated on an opposite side of the pivot axis and form a second roller pair. Within each roller pair the grooves of the rollers are in alignment with one another, while the grooves of the first roller pair are offset with respect to the grooves of the second roller pair by one half of the center-to-center distance between adjoining grooves. Further, supplying rollers for guiding threads to the first and second roller pairs are provided.

4 Claims, 2 Drawing Figures

APPARATUS FOR MAKING CRISSCROSS-WOUND LAYERS TO FORM WOUND BODIES

BACKGROUND OF THE INVENTION

This invention relates to an apparatus for making crisscross-wound layers to produce fiber-reinforced, rotationally symmetrical wound bodies. The apparatus includes a rotatable winding mandrel and a carriage which is displaceable back and forth parallel to the mandrel axis and which carries a thread laying system including stationary thread guiding rollers and thread laying rollers which are swingable about the axis of a common pivotal support. At least the thread laying rollers are provided with circumferential grooves for the guidance and simultaneous deposition, on the mandrel, of several, parallel-extending, resin-saturated fiber filaments or threads.

Wound bodies made of threads, such as glass fiber, Kevlar fiber or carbon fiber threads and an adhesive, such as synthetic resin are formed, as a rule, by circumferentially wound or crisscross-wound layers.

The circumferentially wound layers, wherein the threads are deposited substantially in a circumferential direction on the winding mandrel with a relatively small feed of the carriage supporting the laying roller, result in a high strength in the circumferential direction of the body.

The crisscross-wound layers, wherein the threads are deposited on the mandrel in steep helices with a relatively large feed of the carriage supporting the laying roller, result in a high strength of the wound body in the axial direction as well as in a high bending strength. The helical crisscross windings are usually deposited in laying angles of approximately $\alpha = 45°$ to $90°$, as measured in the circumferential direction of the mandrel. Since helical windings have to be applied in both directions, positive and negative winding angles appear.

A thread laying system of the above-outlined type including a pivotal laying roller pair for an individual thread is disclosed in U.S. Pat. No. 4,359,356 issued Nov. 16, 1982. As shown in FIG. 5 of the patent, the thread is advanced approximately perpendicularly to the winding mandrel axis to a guide roller which is mounted on the outer circumference of a frame affixed to a carriage. The frame is provided with an aperture in which a hollow shaft oriented towards the winding mandrel is pivotally mounted. The thread laying roller pair is carried at the end of the hollow shaft. The thread running from the guide roller passes through the hollow shaft and is alternately deposited on the winding mandrel by one and the other laying roller.

In order to shorten the time for making the crisscross-wound layers, it is in principle possible to deposit simultaneously a plurality of fiber strands on the winding mandrel. Such an arrangement, however, involves the problem that between the individual fiber strands on the winding mandrel undesired gaps appear because of the intermediate webs between the grooves of the laying rollers.

SUMMARY OF THE INVENTION

It is an object of the invention to provide an improved apparatus of the above-outlined type with which several strands may be deposited on the winding mandrel simultaneously and without gaps as a closed (solid) ribbon to thus shorten the manufacturing time for the crisscross-wound layers without adverse quality effects as compared to arrangements which deposit fibers strands individually.

This object and others to become apparent as the specification progresses, are accomplished by the invention, according to which, briefly stated, the apparatus includes a winding mandrel, a carriage reciprocating along the mandrel and a thread laying assembly mounted on the carriage. The assembly has a pivotal device, and four thread laying rollers mounted for rotation on the pivotal device. The shafts of the rollers extend parallel to one another and are situated at points of an imaginary equilateral trapezoid having a plane perpendicular to the roller shafts. Each roller has a plurality of circumferential grooves for simultaneously guiding and depositing on the mandrel a plurality of parallel-running threads. Two rollers are situated on one side of the pivot axis of the pivotal device and form a first roller pair and two rollers are situated on an opposite side of the pivot axis and form a second roller pair. Within each roller pair the grooves of the rollers are in alignment with one another, while the grooves of the first roller pair are offset with respect to the grooves of the second roller pair by one half of the center-to-center distance between adjoining grooves. Further, supplying rollers for guiding threads to the first and second roller pairs are provided.

By virtue of the invention, the fiber strand row deposited by the roller of the one laying roller pair exactly fills the gaps between the fiber strand row deposited by the roller of the other laying roller pair and further, all fiber strands are deposited practically simultaneously at the same location of the winding mandrel and under the same winding angle.

DESCRIPTION OF THE PREFERRED EMBODIMENT

Figure 1:
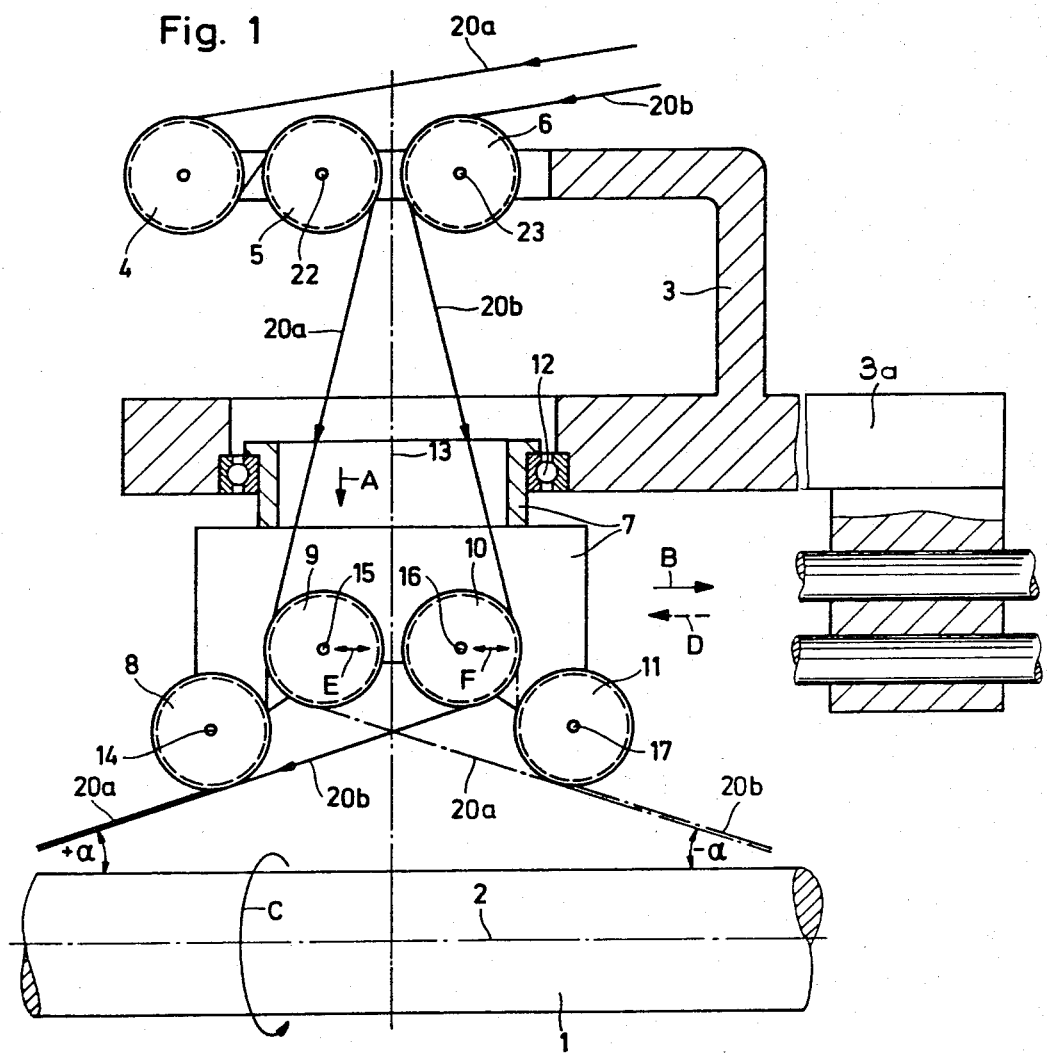
FIG. 1 is a schematic sectional side elevational view of a preferred embodiment of the invention.

Turning now to FIG. 1, there is shown a winding mandrel 1 which is supported for rotation about the mandrel axis 2 as indicated by the arrow C. Above the winding mandrel 1 there is positioned a carriage 3a which is movable back and forth parallel to the mandrel axis 2. On the carriage there is mounted a fiber strand laying system which essentially comprises a holding arm 3 on which there are rotatably mounted strand supply rollers 4, 5 and 6 as well as a pivotal device 7, on the lower end of which there are mounted strand laying rollers 8, 9, 10 and 11. The pivotal device 7 is supported with the intermediary of a ball-bearing 12 in a bore of the holding arm 3 in such a manner that the pivotal axis 13 of the pivotal device 7 extends perpendicularly to the mandrel axis 2. The shafts 14, 15, 16 and 17 of the respective laying rollers 8, 9, 10 and 11 are arranged parallel to one another in the pivotal device 7 in such a manner that they form—as viewed in cross section—the corner points of an equilateral trapezoid. The two outer rollers 8 and 11 and the two inner rollers 9 and 10 are at the same distances from the axes 13 and 2, respectively.

Figure 2:
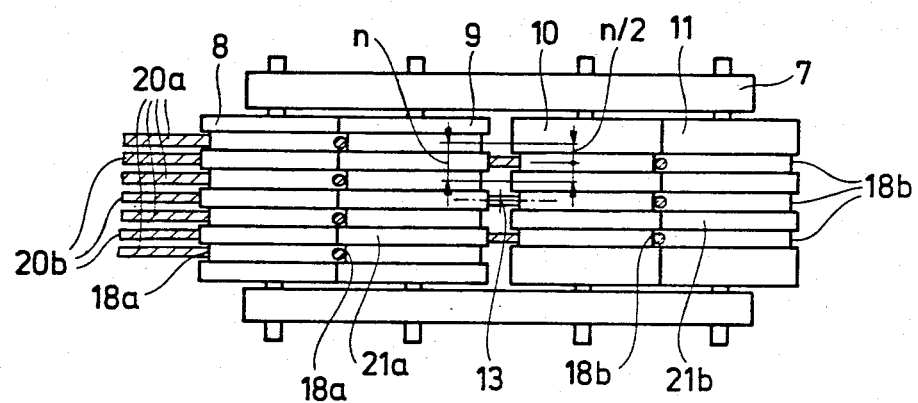
FIG. 2 is a top plan view of some of the components of the preferred embodiment as viewed in the direction of the arrow A in FIG. 1.

Turning now to FIG. 2, the laying rollers 8 and 9 on the left side of the pivotal axis 13 form a first roller pair and the laying rollers 10 and 11 on the right side of the pivotal axis 13 form a second roller pair. Rollers 8 and 9 each have axially spaced circumferential grooves 18a, whereas rollers 10 and 11 each have axially spaced circumferential grooves 18b. While the grooves 18a on the two rollers 8 and 9 and the grooves 18b on the two rollers 10 and 11 are in alignment with one another, the grooves 18a of the roller pair 8 and 9 are axially offset with respect to the grooves 18b of the roller pair 10, 11 by one-half of the center-to-center distance n between two adjoining grooves on one roller. By virtue of this arrangement the fiber strands 20b deposited by the roller pair 10, 11 fit precisely in the gaps between the fiber strands 20a deposited by the roller pair 8, 9. In the illustrated example the intermediate webs 21a, 21b between the grooves 18a and 18b, respectively, have approximately the same width as the grooves. In practice, the grooves adapted to the cross section of the individual fiber strands 20a, 20b are made slightly wider than the webs because the fiber strands, dependent upon the tension exerted thereon by the winding mandrel, may pull slightly closer together after they leave the laying rollers.

With each laying roller pair 8, 9 as well as 10, 11 there are associated respective fiber supply rollers 5 and 6 whose respective axes 22 and 23 extend perpendicularly to the winding mandrel axis 2. In order to achieve a precise symmetry of the two fiber strands 20a and 20b supplied to the rollers 8–11 with respect to the pivotal axis 13, a deflecting roller 4 is provided upstream of the supply roller 5, as viewed in the direction of run of the fiber strand 20a.

In the position depicted in FIG. 1, the carriage 3a with the holder arm 3 moves from the left to the right in the direction of the arrow B. Simultaneously, the winding mandrel rotates about its axis 2 in the direction of the arrow C. As a result, the fiber strand row 20a delivered by the roller 5 is deposited on the winding mandrel 2 at a winding angle α by the outer laying roller 8 with the intermediary of the inner laying roller 9. In order to achieve that the fiber strand row 20b taken from the roller 6 and to be deposited by the inner roller 10 is simultaneously laid on the same location and under the same angle α on the winding roller 2 as the fiber strand 20a, the inner rollers 9 and 10 are, with respect to the outer rollers 8 and 11, adjustable in the pivotal device 7 in the direction of the pivotal axis 13 as indicated by the arrows E and F so that, for example, the rollers 8 and 10 may be set in such a manner that the fiber strand rows 20a and 20b extend in the same plane as they leave the rollers 8 and 10.

After reaching the right-hand end of the winding mandrel 1, the carriage 3a reverses direction and moves from the right to the left as indicated by the arrow D. Upon such reversal of direction, the fiber strand row 20b is taken over by the outer roller 11 while the fiber strand row 20a is deposited directly by the inner laying roller 9, as illustrated in dash-dot lines in FIG. 1. The laying angle will then be −α. In order to ensure a smooth takeover of the fiber strand rows 20a and 20b from the inner rollers by the outer rollers as the carriage reverses direction from right to left or from left to right, the rollers of each of the two roller pairs 8, 9 and 10, 11 are arranged in such a manner that—as viewed in FIG. 2—the inner roller 9 slightly overlaps the outer roller 8 and the inner roller 10 slightly overlaps the outer roller 11.

While in the illustrated example all rollers have the same diameter, it will be understood that the invention may be practiced with rollers which have different diameters or one or more rollers may be replaced by other guide means having the same function.

It will be understood that the above description of the present invention is susceptible to various modifications, changes and adaptations, and the same are intended to be comprehended within the meaning and range of equivalents of the appended claims.

What is claimed is:

1. In an apparatus for making a rotationally symmetrical body formed of crisscross-wound layers, the apparatus including a winding mandrel rotatable about a longitudinal mandrel axis; a carriage arranged for reciprocating travel along said mandrel and thread laying means mounted on said carriage; the improvement in said thread laying means comprising:
   (a) a pivotal device having a pivot axis oriented perpendicularly to said mandrel axis;
   (b) spaced first, second, third and fourth thread laying rollers mounted for rotation on said pivotal device and each having a roller shaft; the roller shafts extending parallel to one another and being situated at points of an imaginary equilateral trapezoid having a plane perpendicular to the roller shafts; said first and fourth thread laying rollers being outer rollers and said second and third thread laying rollers being inner rollers; the roller shafts of said inner rollers being at the same distance from said pivot axis and at the same distance from said mandrel axis; the roller shafts of said outer rollers being at the same distance from said pivot axis and at the same distance from mandrel axis; each said thread laying roller having a plurality of circumferential grooves for simultaneously guiding and depositing on said mandrel a plurality of parallel-running threads; the distance separating adjoining grooves on each said thread laying roller being approximately equal to the center-to-center distance between adjoining grooves; the first and second thread laying rollers being situated on one side of said pivot axis and forming a first roller pair and the third and fourth thread laying rollers being situated on an opposite side of said pivot axis and forming a second roller pair; within each roller pair the grooves of one thread laying roller being in alignment with the grooves of the other thread laying roller; the grooves of said first roller pair being offset with respect to the grooves of the second roller pair by one half of said center-to-center distance in a direction parallel to said roller shafts; and
   (c) first and second thread supplying rollers for guiding threads to said first and second roller pairs, respectively; said thread supplying rollers being supported for rotation externally of said pivotal device and each having a roller shaft extending perpendicularly to said mandrel axis; said thread supplying rollers being situated with respect to one another such that the threads guided by said first supplying roller to said first roller pair and the threads guided by said second supplying roller to said second roller pair extend symmetrically relative to said pivot axis.

2. An apparatus as defined in claim 1, wherein the position of the roller shaft of each inner roller is adjustable with respect to the outer roller of the respective roller pair for setting the threads running from each roller pair towards said mandrel into a coplanar relationship.

3. An appartus as defined in claim 1, wherein the thread laying rollers in each roller pair slightly overlap as viewed in a direction parallel to said pivot axis.

4. In an apparatus for making a rotationally symmetrical body formed of crisscross-wound layers, the apparatus including a winding mandrel rotatable about a longitudinal mandrel axis; a carriage arranged for reciprocating travel along said mandrel and thread laying means mounted on said carriage; the improvement in said thread laying means comprising:

(a) a pivotal device having a pivot axis oriented perpendicularly to said mandrel axis;

(b) spaced first, second, third and fourth thread laying rollers mounted for rotation on said pivotal device and each having a roller shaft; the roller shafts extending parallel to one another and being situated at points of an imaginary equilateral trapezoid having a plane perpendicular to the roller shafts; said first and fourth thread laying rollers being outer rollers and said second and third thread laying rollers being inner rollers; each said thread laying roller having a plurality of circumferential grooves for simultaneously guiding and depositing on said mandrel a plurality of parallel-running threads; the first and second thread laying rollers being situated on one side of said pivot axis and forming a first roller pair and the third and fourth thread laying rollers being situated on an opposite side of said pivot axis and forming a second roller pair; within each roller pair the grooves of one thread laying roller being in alignment with the grooves of the other thread laying roller; the grooves of said first roller pair being offset with respect to the grooves of the second roller pair in a direction parallel to said roller shafts by one half of the center-to-center distance between adjoining grooves; and (c) first and second thread supplying rollers for guiding threads to said first and second roller pairs, respectively; said thread supplying rollers being supported for rotation externally of said pivotal device.

* * * * *